Oct. 27, 1925.

H. P. BARRAS 1,558,775

CUT-OUT FOR TRACTORS

Filed Sept. 20, 1924

WITNESSES

Lawrence O. Hankin

INVENTOR

Herbert P. Barras,

BY Munn & Co.

ATTORNEYS

Oct. 27, 1925.
H. P. BARRAS
1,558,775
CUT-OUT FOR TRACTORS
Filed Sept. 20, 1924   2 Sheets-Sheet 2
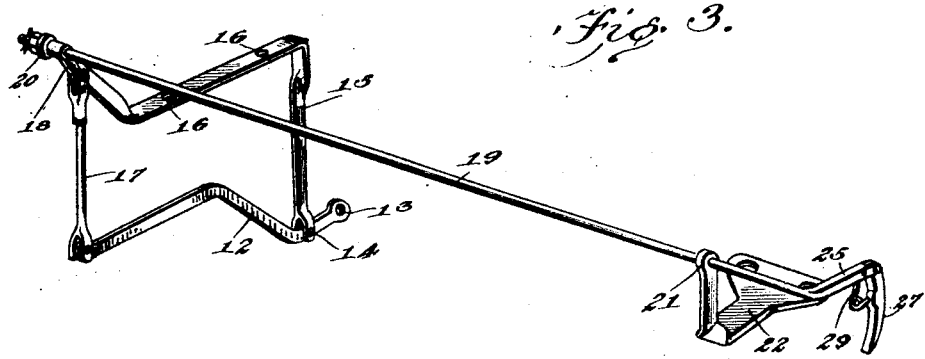
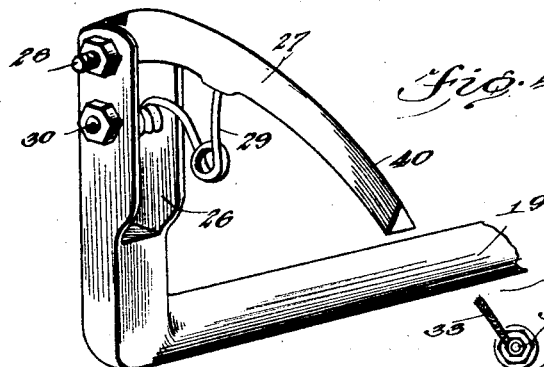
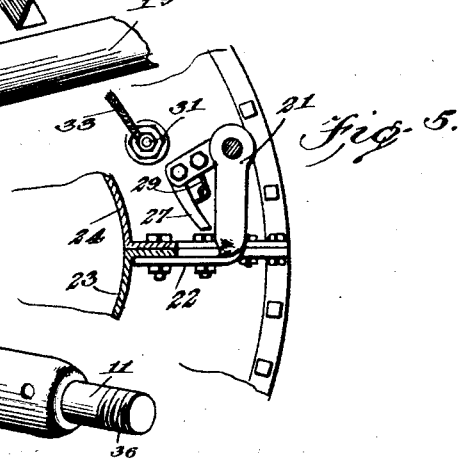
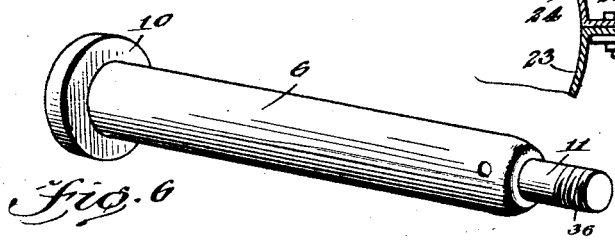
WITNESSES
INVENTOR
Herbert P. Barras,
BY
ATTORNEYS Patented Oct. 27, 1925.

1,558,775

UNITED STATES PATENT OFFICE.

HERBERT P. BARRAS, OF JEANERETTE, LOUISIANA, ASSIGNOR OF ONE-FOURTH TO PAUL A. LE BOURGEOIS AND ONE-FOURTH TO PAUL G. LE BOURGEOIS, BOTH OF JEANERETTE, LOUISIANA.

CUT-OUT FOR TRACTORS.

Application filed September 20, 1924. Serial No. 738,877.

*To all whom it may concern:*

Be it known that I, HERBERT P. BARRAS, a citizen of the United States, and a resident of Jeanerette, in the parish of Iberia and State of Louisiana, have invented certain new and useful Improvements in Cut-Outs for Tractors, of which the following is a specification.

This invention relates to cut-outs for the ignition system of tractors. The well known Fordson tractor, due to the fact that when the traction wheels of a machine are stalled, is equipped with an engine of such power that the engine will not be readily choked or stalled when the traction wheels have become blocked and therefore the body of the tractor will be elevated at the front wheels and will be tilted backwardly throwing the tractor upon the driver.

It is an object of my invention to provide a device which may be readily connected with the usual Fordson tractor and which will drown the ignition system and stop the engine as soon as the forward end of the tractor is elevated when the traction wheels are blocked.

A further object of the invention is the provision of a device which will permit the relative movements between the front running gear and the body of the tractor whereby a lever will be operated for causing operation of a switching device for grounding the circuit of the ignition system of the tractor.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 3 is a view in perspective of the various levers and links in connected relation for operating the switching mechanism.

Figure 4 is a fragmentary view in perspective of the cut out mechanism.

Figure 5 is a fragmentary end view showing the cut-out in an inoperative position.

Figure 6 is a view in perspective of the trunion pin which connects the forward end of the tractor to the front axle.

Figure 7 is a fragmentary view in perspective of the connection between the front axle and the tractor body.

Figure 1:
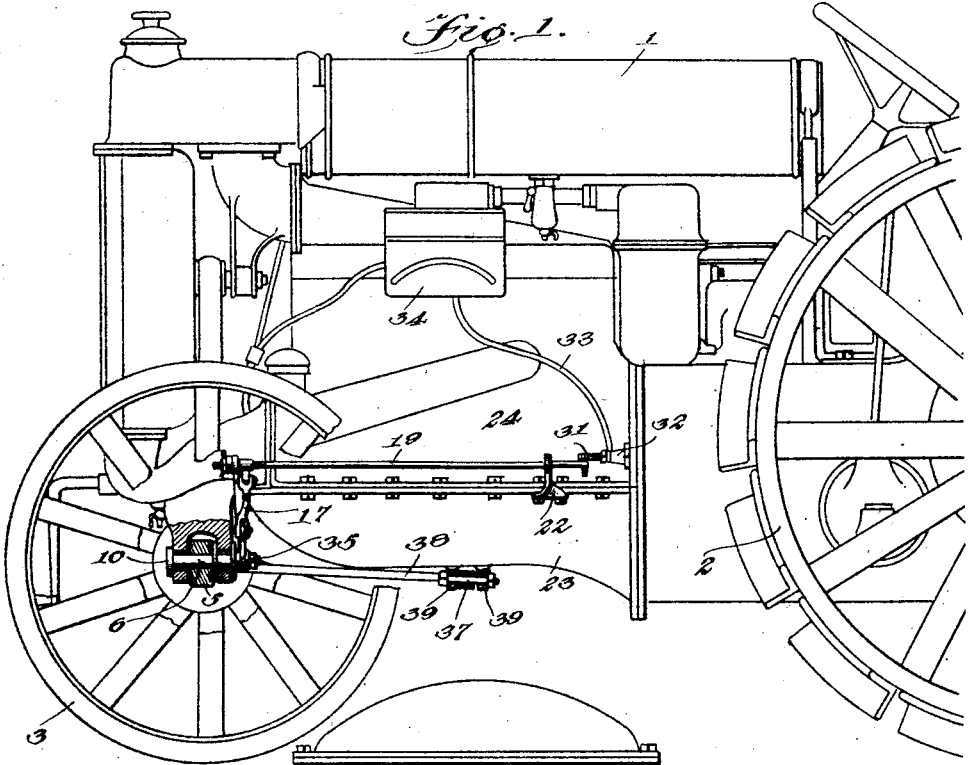
Figure 1 is a side view of a tractor partly in section showing my invention applied thereto.
Figure 2:
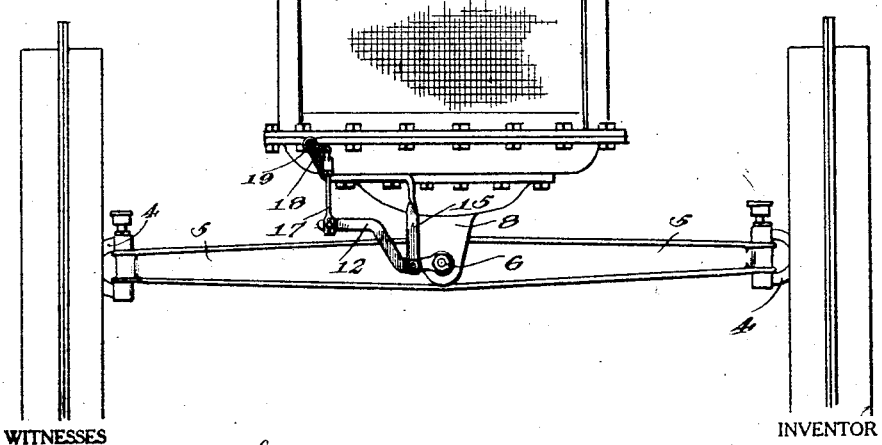
Figure 2 is an elevation of the forward end of the tractor at the rear of the radiator.

Referring more particularly to the drawings, 1 designates a tractor body having traction wheels 2 and front wheels 3. The front wheels are carried by the usual steering knuckles 4 at the ends of the front axle 5. This front axle is provided with a perforation through which a trunnion pin 6 is inserted with the ends of the trunnion pin which project upon opposite sides of the axle being received within elongated perforations 7 in the bifurcated end 8 of the forward end of the tractor body.

An ear 9 formed by the bifurcated depending portion 8 is adapted to embrace the axle 5. The case-hardened steel washer is mounted on the pin 6 where the pin passes through the rear perforation 7 in the member 8 in order to prevent wear upon this portion of the tractor body.

The pin 6 is provided with a head 10 which engages the outer face of the outer ear 9 of the depending member 8. The inner end of the pin is reduced as shown at 11 upon which a lever 12 is connected at 13. The lever is pivoted at 14 in the forked end of a bracket 15 which is secured through the perforations 16 and the bolts of the engine cover to the body of the tractor.

The outer free end of the lever 12 is connected by a link 17 to a rock lever 18. This lever is rigid with a shaft 19. The shaft is mounted in a bearing 20 formed upon the outer free end of the bracket 15 and in a bearing 21 mounted upon a bracket plate 22 which is likewise secured as shown in Figure 1 by means of the usual bolts to the flanges between the crank case 23 and the engine casing 24. The outer end of the rock shaft 19 is provided with an arm 25. This arm is slotted as shown at 26 and receives the inner end of a knife switch 27. The switch is pivoted upon a bolt 28 and a spring 29 having one end secured to a bolt 30 is adapted to engage the switch and force the same outwardly.

When the shaft 19 is operated the switch is adapted to engage a brass screw 31 which is connected with the usual magneto binding post 32. This binding post has electrical connections as shown at 33 with the coil box 34. A nut 35 screwed upon the threaded end 36 of the pin 6 maintains the perforated end of the lever 12 upon the reduced end of the pin.

In order to permit a certain amount of play between the front axle and the body of the tractor the pin 37 formed at the inner end of the radius rod 38 is sheared about $\frac{1}{16}$ of an inch and the bearings 39 which support the pin are also sheared at diametrically opposite points in order to permit such play between the connection at the end of the radius rods and its bearings.

The operation of my device is as follows:

When the tractor is being driven normally along the knife switch 27 is out of contact with the brass screw 31. If for any reason the traction wheels 2 should be blocked and be prevented from further rotation, and while the engine is operating the continued operation of the engine will cause the worm gears and worm on the rear axle to elevate the forward end of the tractor or in other words cause the tractor to revolve upon the rear axle and be elevated. As soon as this happens the body will be raised thereby raising the ears 9 and since the openings 7 in the ears 9 are elongated the body will be permitted to rise at least ½ inch before the lower end of the opening 7 engages the pin and tends to relieve the front axle and the wheels. As soon as the forward end of the tractor is raised the bracket 15 will be elevated causing the outer free end of the lever 12 to be oscillated, shifting the link 17 upwardly, actuating the rock lever 18 for rocking the shaft 19. The rocking of shaft 19 likewise rocks arm 25 and causes the knife switch 27 to engage the brass screw 31. As soon as this happens the circuit for the magneto will be grounded and the engine will be stopped.

The construction is such that when the forward end of the tractor body is raised ½ inch relative to the front axle the lever will be operated to cause the switch 27 to short circuit the magneto circuit.

It will be noted that the switch 27 is triangular in cross section and presenting a sharp edge 40 to the screw 31 so that if there is any grease or dirt on said screw at the time the cut-out is operated the knife edge will bite through the same and short circuit the ignition system regardless of such grease.

It will be noted that the perforations in the lugs 39 which receive the inner end of the radius rods 38 are elongated to permit slight play of the rods, otherwise the radius rods would tend to prevent relative movements between the axle 5, and the tractor body and thus resist operation of the cut-out mechanism.

By my construction, the tractor may carry and start a heavier load. The motor will start and stop each time the body is lifted from the front axle, the motor starting immediately upon the weight of the body falling upon the front axle. This action causes a jerking of the load much in the same manner as a locomotive does in starting to pull a long train of cars.

When the body returns to the normal position on the axle, the engine will speed up because of the renewal of the current through the closed circuit and the motor will continue in operation if the pistons have not stopped reciprocating.

What I claim is:

1. In a tractor, the combination of a frame, a front axle, a pin on the axle, the frame having an elongated slot to receive the pin whereby the frame is connected to the axle but permitting relative movements through said frame and axle, a lever pivoted on the pin, means connecting the lever with the frame, a rock shaft on the frame, means operatively connecting the rock shaft with the lever, an ignition system, means actuated by the rock shaft for grounding the ignition system during relative movements between the front axle and the frame.

2. In a tractor, the combination of a frame, a front axle, a pin on the axle, the frame having an elongated slot to receive the pin whereby the frame is connected to the axle but permitting relative movements through said frame and axle, a lever pivoted on the pin, means connecting the lever with the frame, a rock shaft on the frame, means operatively connecting the rock shaft with the lever, an ignition system, a contact in circuit with the ignition system, a knife switch actuated by the rock shaft for engaging the contact to ground the ignition system during relative movements between the front axle and the frame.

3. In a tractor, the combination of a frame, a front axle, a pin on the axle, the frame having an elongated slot to receive the pin whereby the frame is connected to the axle but permitting relative movements through said frame and axle, a lever pivoted on the pin, means connecting the lever with the frame, a rock shaft on the frame, means operatively connecting the rock shaft with the lever, an ignition system, a contact in circuit with the ignition system, a second contact having a biting edge mounted on the rock shaft and actuated by said shaft, the second contact adapted to engage the contact in the ignition system and cut through foreign matter on the contact to insure electrical connection.

4. In a tractor, the combination of a frame, a front axle, a pin on the axle, the frame having an elongated slot to receive the pin whereby the frame is connected to the axle but permitting relative movements through said frame and axle, a lever pivoted on the pin, means connecting the lever with the frame, a rock shaft on the frame, means operatively connecting the rock shaft with the lever, an ignition system, a contact in circuit with the ignition system, a second contact connected with the rock shaft, operated thereby and adapted to have a slight relative movement independent of the movement of the rock shaft, and a spring for resisting the independent movement of the contact, the second contact being adapted to engage the contact in the ignition system for grounding said system during relative movement between the front axle and the frame.

HERBERT P. BARRAS.